US012683326B2

(12) United States Patent
Canseco et al.

(10) Patent No.: US 12,683,326 B2
(45) Date of Patent: Jul. 14, 2026

(54) RECEPTACLE WITH INTERLOCKING ASSEMBLY

(71) Applicant: Eaton Intelligent Power Limited, Dublin (IE)

(72) Inventors: Erik Garcia Canseco, Ciudad Ixtapaluca (MX); Elias Martinez Valerio, Ciudad Nezahualcoyotl (MX); Alejandro Garcia Manzano, Tultitlán (MX); Luis Manuel Alba Regalado, Mexico City (MX)

(73) Assignee: EATON INTELLIGENT POWER LIMITED, Dublin (IE)

( * ) Notice: Subject to any disclaimer, the term of this patent is extended or adjusted under 35 U.S.C. 154(b) by 323 days.

(21) Appl. No.: 18/490,446

(22) Filed: Oct. 19, 2023

(65) Prior Publication Data

US 2024/0136765 A1 Apr. 25, 2024
US 2024/0235114 A9 Jul. 11, 2024

Related U.S. Application Data

(60) Provisional application No. 63/380,403, filed on Oct. 21, 2022.

(51) Int. Cl.
*H01R 13/629* (2006.01)
*H01R 13/533* (2006.01)

(52) U.S. Cl.
CPC ......... *H01R 13/629* (2013.01); *H01R 13/533* (2013.01)

(58) Field of Classification Search
CPC ............................ H01R 13/629; H01R 13/533
USPC .......................................................... 439/345
See application file for complete search history.

(56) References Cited

U.S. PATENT DOCUMENTS 3,156,512 A * 11/1964 Peterson .............. H01R 13/629 439/258
4,553,000 A * 11/1985 Appleton ............. H01R 13/707 200/51.09
5,147,988 A 9/1992 Appleton
5,212,624 A * 5/1993 Johnson ............... H01R 13/707 200/51 R
10,950,968 B2 * 3/2021 Fair ...................... H01R 13/428
12,136,786 B2 * 11/2024 Mizutani .............. H01R 13/639
2003/0157825 A1 * 8/2003 Kane .................... H01R 13/641 439/352
2021/0143579 A1 * 5/2021 Moreau .............. H01R 13/6275
2023/0104525 A1 * 4/2023 Garcia Canseco .. H01R 13/629 439/660

* cited by examiner

*Primary Examiner* — Harshad C Patel
(74) *Attorney, Agent, or Firm* — Stinson LLP

(57) ABSTRACT

A receptacle includes a housing having a port for receiving a plug. An interlock assembly is provided for locking and unlocking the plug to the housing and includes a unitary main shaft having a first end and a second end. The second end is contoured to extend radially from a longitudinal axis of the main shaft. A spring is coaxial with the longitudinal axis and is configured to engage the second end of the main shaft. The spring is configured to apply a rotational biasing force to the main shaft to bias the main shaft toward a locked position wherein a locking bar attached to the first end of the main shaft engages and locks the plug to the housing. A tab is attached to the first end of the main shaft and is configured to rotate the main shaft between the locked position and an unlocked position.

10 Claims, 6 Drawing Sheets

RECEPTACLE WITH INTERLOCKING ASSEMBLY

FIELD

The subject application relates to an interlock mechanism. More particularly, an optimized shaft for use in the interlock mechanism for locking and unlocking a plug to a receptacle.

BACKGROUND

Receptacles find particular application in light assemblies and are designed to receive a plug. The receptacle includes a port for receiving the plug and an interlock mechanism for locking and unlocking the plug to and from the receptacle. A user engages, e.g., turns, the interlock to selectively lock and unlock the plug to and from the receptacle. To accomplish this, conventionally the interlock mechanism includes a multi-component assembly. In particular, the interlock mechanism includes a main shaft, a washer, an arm and a screw. All of these components are assembled together and operate to lock and unlock the plug to and from the receptacle.

The conventional multi-component assembly is prone to many failure modes due to the number of parts and the complexity of the assembly. Moreover, repeated use of the main shaft and other components results in wear and eventual failure of these components.

There is a need for an optimized interlock mechanism that has fewer parts and is more reliable than conventional interlock mechanisms.

The present invention provides an interlock mechanism with an optimized locking shaft that meets the requirements of repeated and reliable use in harsh and hazardous environments while allowing for repeated and reliable locking and unlocking of a plug to and from a receptacle.

SUMMARY OF THE INVENTION

There is provided a receptacle for receiving a plug. The receptacle includes a housing having a port for receiving the plug. An interlock assembly is provided for locking and unlocking the plug to the housing. The interlock assembly includes a unitary main shaft having a first end and a second end. The second end is contoured to extend radially from a longitudinal axis of the main shaft. A spring is coaxial with the longitudinal axis of the main shaft and is configured to engage the second end of the main shaft. The spring is configured to apply a rotational biasing force to the main shaft to bias the main shaft toward a locked position wherein a locking bar attached to the first end of the main shaft engages and locks the plug to the housing. A tab is attached to the first end of the main shaft and is configured to rotate the main shaft between the locked position and an unlocked position.

In the foregoing embodiment, a spring is attached to the first end of the main shaft for biasing a locking bar attached to the main shaft into an unlocked position.

In the foregoing embodiment, the second end is contoured to have a constant bend radius.

In the foregoing embodiment, the second end extends at a right angle from the longitudinal axis of the main shaft.

In the foregoing embodiment, the second end includes a hole or slot configured to engage the spring.

DETAILED DESCRIPTION

The following presents a description of the disclosure; however, aspects may be embodied in many different forms and should not be construed as limited to the embodiments set forth herein. Furthermore, the following examples may be provided alone or in combination with one or any combination of the examples discussed herein.

Figure 1:
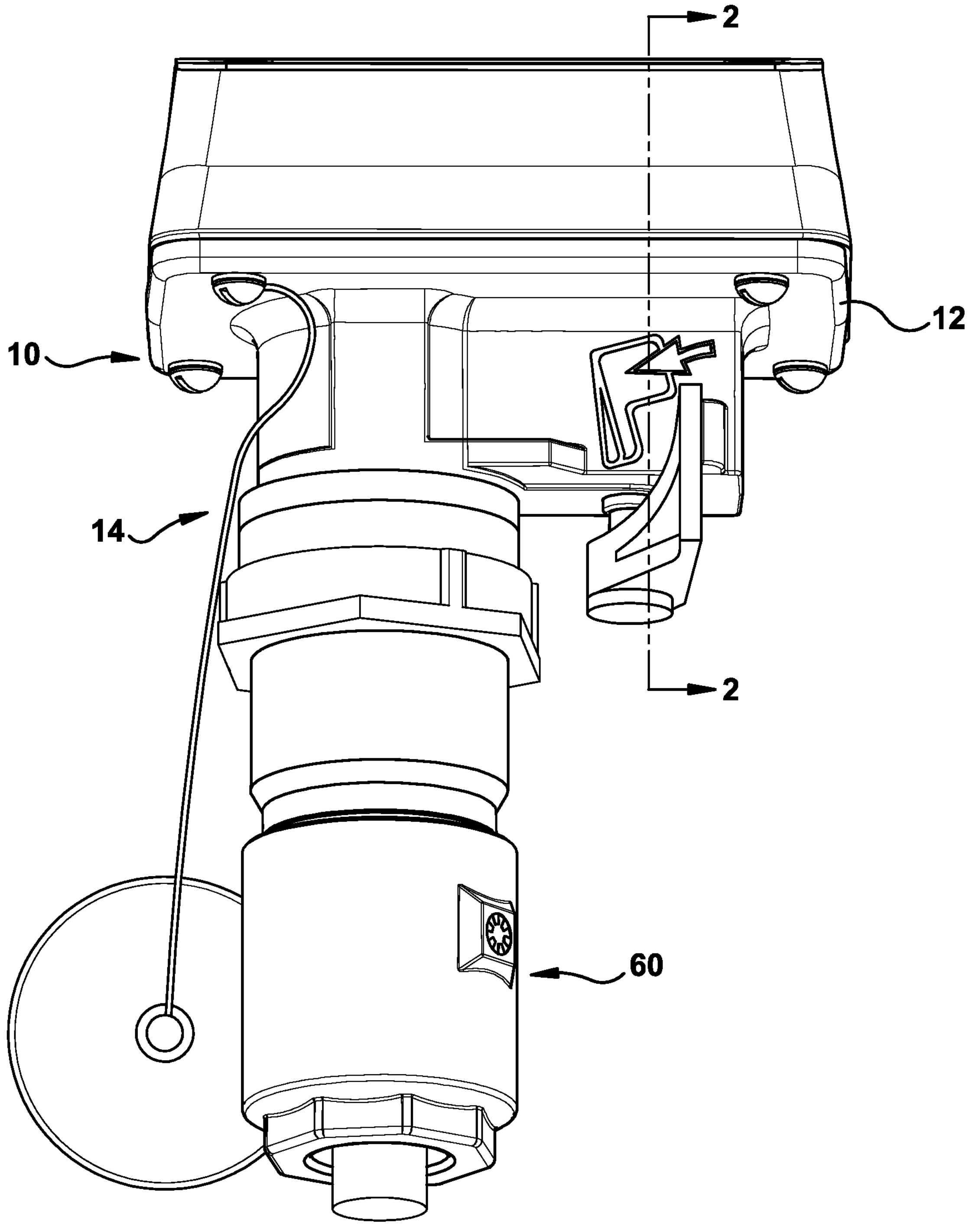
FIG. 1 (Prior Art)
FIG. 1 is side elevation view of a conventional receptacle having a plug attached thereto.

As shown in FIG. 1, a receptacle 10, in general, includes a housing 12 having a receiving port 14 for attachment of a plug 60 to the housing 12 and a conventional interlock mechanism 20 (FIG. 2) for locking and unlocking the plug 60 to and from the receptacle 10. The interlock mechanism 20 (FIG. 2) is disposed in the housing 12 and is configured to rotate between a locked position and an unlocked position when actuated by a user, as described in detail below.

Figure 2:
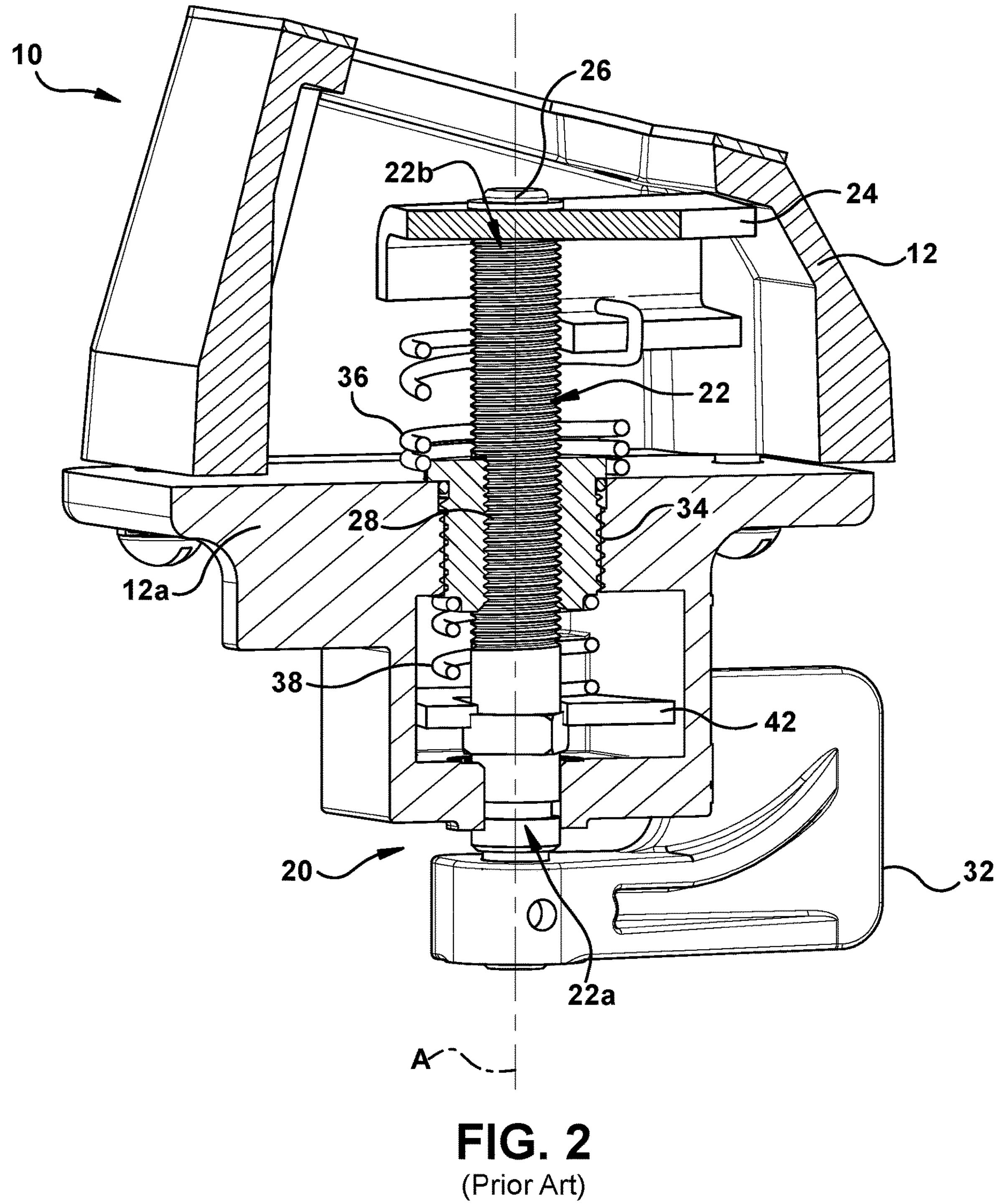
FIG. 2 (Prior Art)
FIG. 2 is a sectioned side view of the receptacle of FIG. 1 taken along line 2-2 of FIG. 1.

Referring to FIG. 2, the interlock mechanism 20, in general, includes a main shaft 22, an arm 24 and a screw and washer combination 26. The main shaft 22 includes a first end 22*a* attached to a handle 32 for rotating the main shaft 22 about a longitudinal axis A of the main shaft 22. The screw and washer combination 26 are attached to the second end 22*b* of the main shaft 22 for securing the arm 24 to the main shaft 22. When attached to the main shaft 22, the arm 24 extends radially from the second end 22*b* of the main shaft 22.

The main shaft 22 includes a threaded portion 28 that is threaded into a bushing 34 positioned in an inner wall 12*a* of the housing 12. The bushing 34 includes an inner threaded bore that engages the thread portion 28 of the main shaft 22 for allowing the main shaft 22 to turn within the bushing 34 when the handle 32 rotates the main shaft 22.

Positioned between the second end 22*b* of the main shaft 22 and the inner wall 12*a* of the housing 12 is a biasing spring 36. The biasing spring 36 is configured to apply a torsional biasing force to the second end 22*b* of the main shaft 22 to bias the main shaft 22 toward the locked position, as described in detail below.

A second spring 38 is positioned between the bushing 34 and a locking bar 42. When the main shaft 22 is rotated to the locked position, a shoulder of the main shaft 22 engages the locking bar 42 and causes it to pivot in the housing 12 against the biasing force of the second spring 38. The locking bar 42 pivots until it engages the plug 60 thereby locking it to the receptacle 10. As viewed from the handle 32, rotating the main shaft 22 in the clockwise direction causes the locking bar 42 to engage the plug 60 (FIG. 1). Rotation of the main shaft 22 toward the locked position is assisted by the rotational biasing force applied by the spring

36. The rotational biasing force is configured to help maintain the main shaft 22 in the locked position when the user releases the handle 32.

Rotating the main shaft 22 in the counter-clockwise direction (as viewed from the handle 32) causes the shoulder of the main shaft 22 to apply less pressure to the locking bar 42. The second spring 38, along with the releasing of pressure from the main shaft 22, causes the locking bar 42 to pivot away from the plug 60 and eventually disengage from it. The locking bar 42 is completely disengaged from the plug 60 when the main shaft 22 has rotated to the unlocked position.

As the main shaft 22 rotates in the counter-clockwise direction, the arm 24 on the second end 22*b* applies a rotational displacement to the biasing spring 36. This rotational displacement causes the biasing spring 36 to increase the biasing force it applies to the arm 24.

As described above, the interlock mechanism 20 includes a plurality of parts that interact with each other and require excessive parts and prolong assembly time. The present invention provides an improved shaft assembly.

Figure 3A:
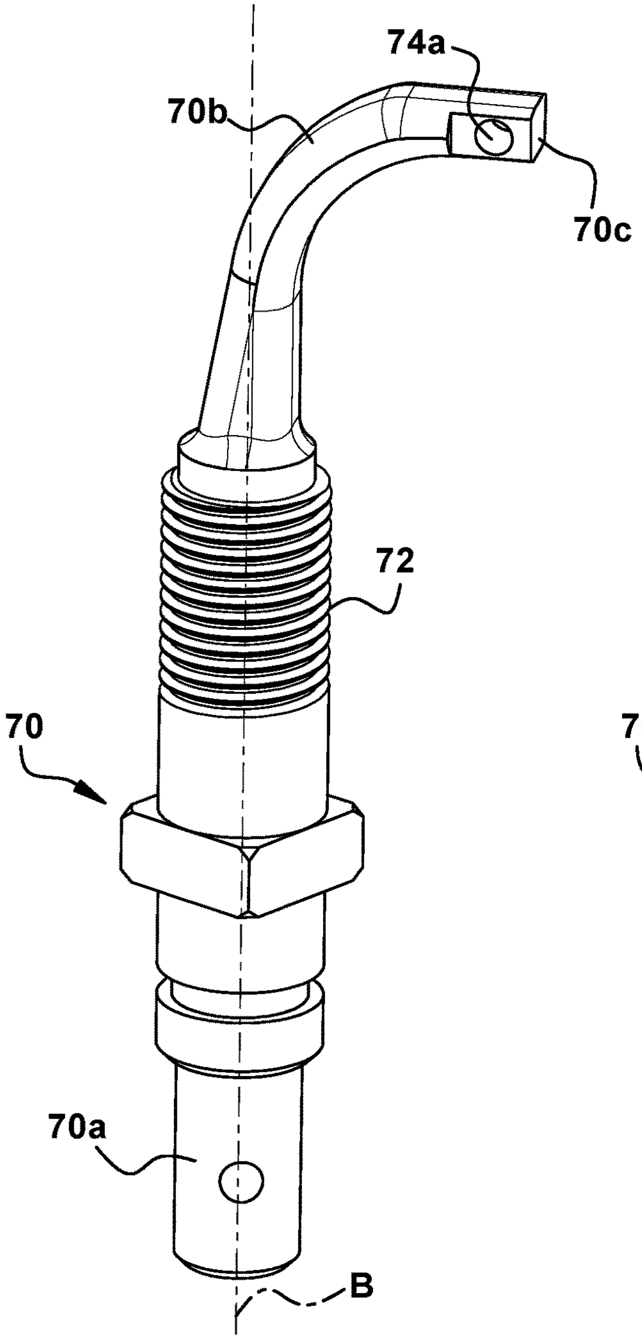
FIG. 3A is a perspective side view of an optimized main shaft, according to a first embodiment of the present invention.
Figure 4:
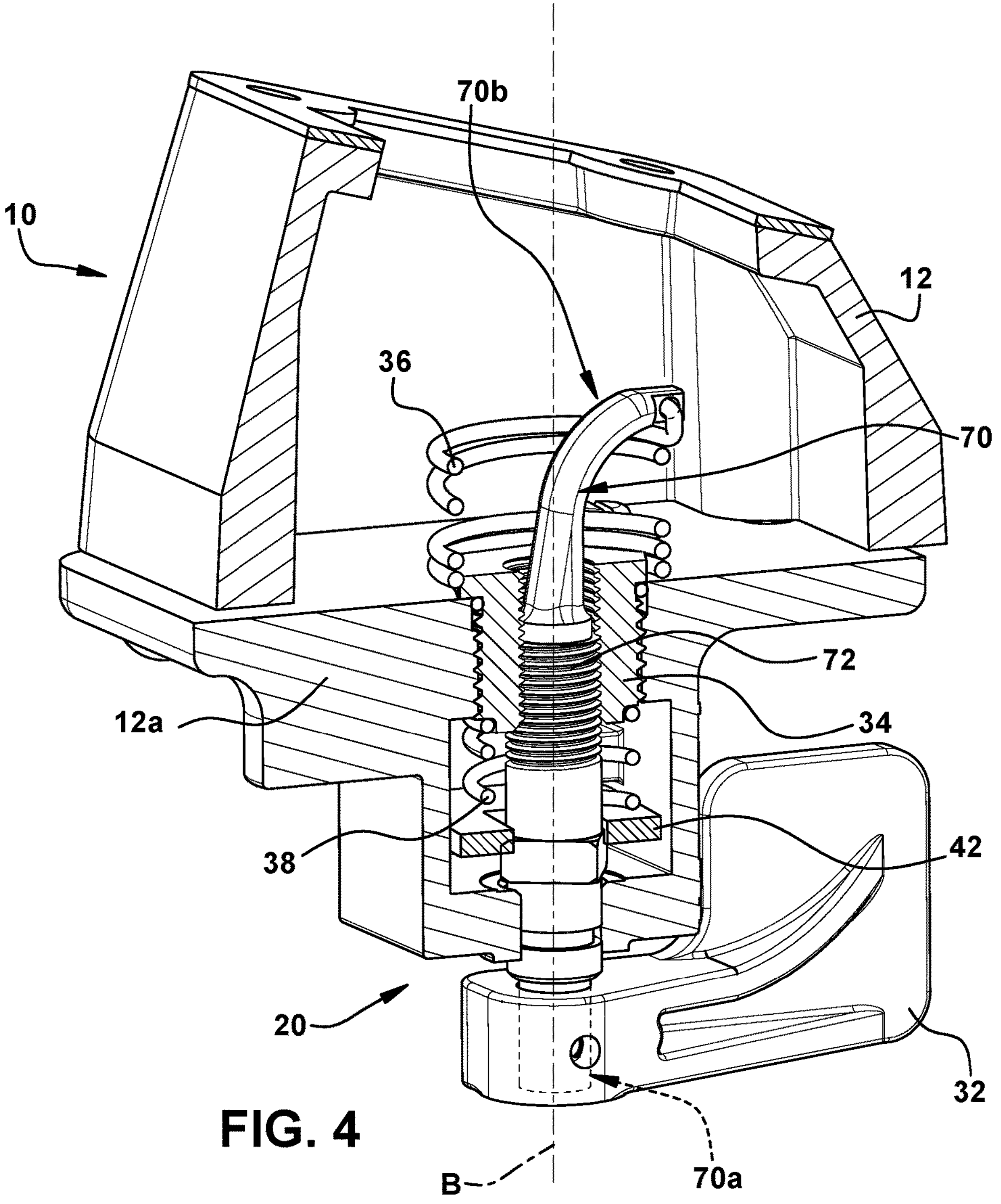
FIG. 4 is a sectioned side view of the optimized main shaft of FIG. 3A positioned within a receptacle.
Figure 5:
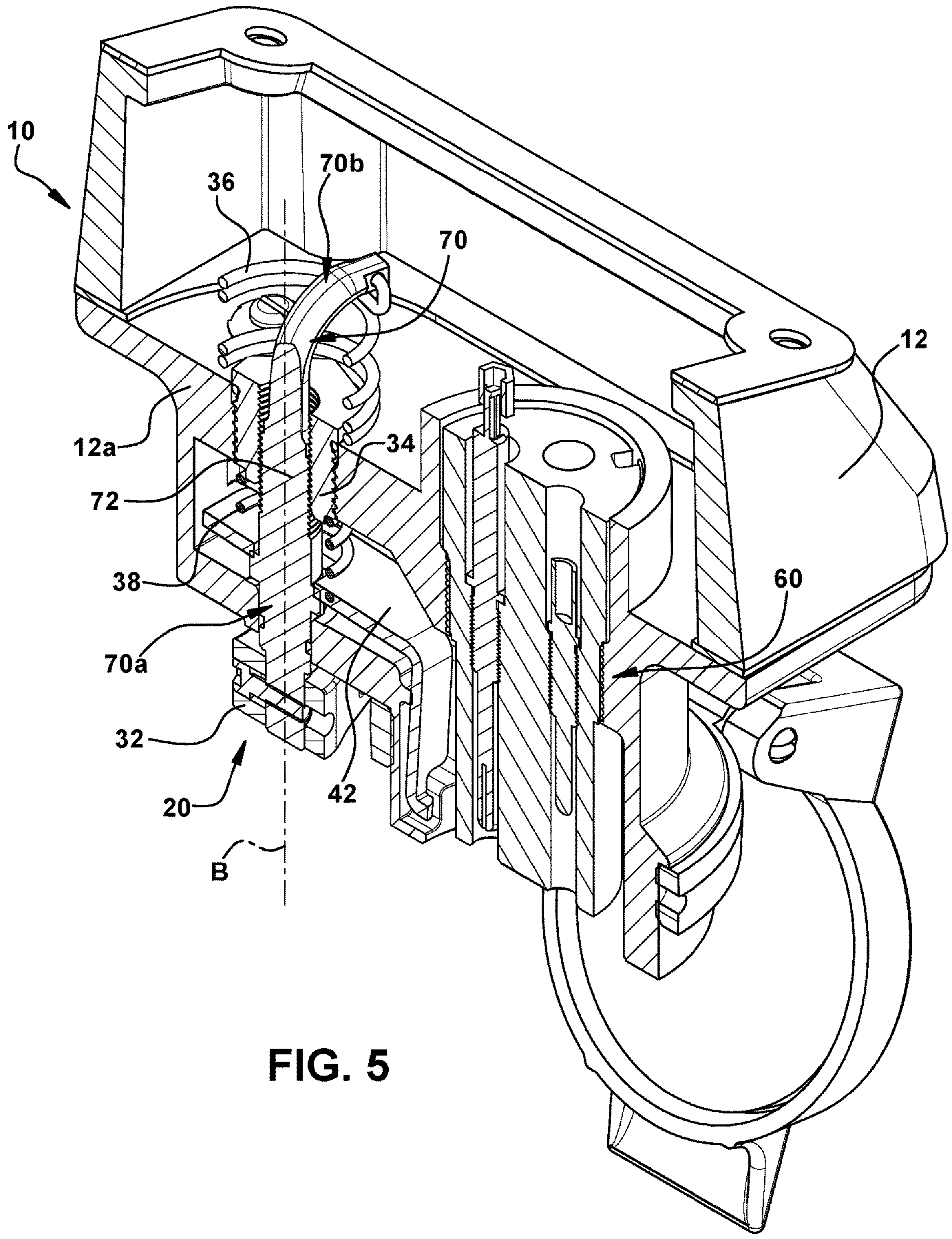
FIG. 5 is a sectioned side view of the receptacle of FIG. 4 taken along a plane orthogonal to FIG. 4.

According to the present invention, the main shaft 22, the arm 24 and the screw and washer combination 26 are replaced with an optimized main shaft 70. Referring to FIG. 3A, the main shaft 70 includes a first end 70*a* and a second end 70*b*. A threaded portion 72 of the main shaft 70 is adjacent the second end 70*b*. The threaded portion 72 is dimensioned to engage the inner bore of the bushing 34 (see, FIGS. 4 and 5) that is attached to the inner wall 12*a* of the housing 12 (FIGS. 4 and 5).

Figure 3B:
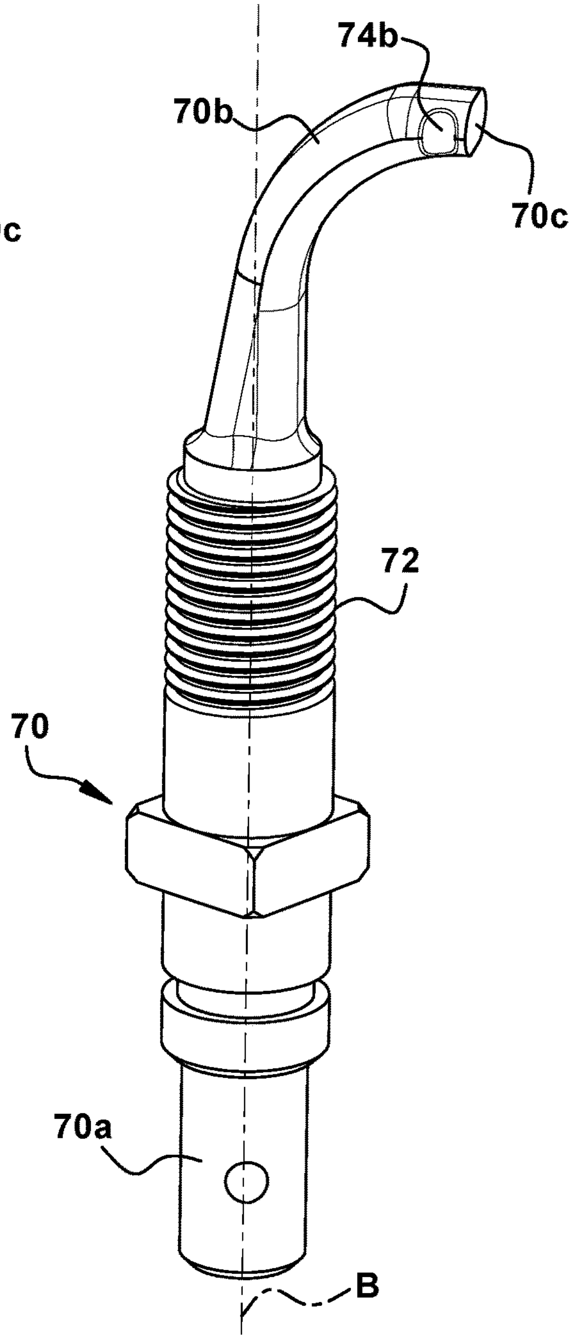
FIG. 3B is a perspective side view of an optimized main shaft, according to a second embodiment of the present invention.

The second end 70*b* of the main shaft 70 is contoured, e.g., curved, such that a distal end 70*c* of the main shaft 70 is extends radially away from the longitudinal axis B of the main shaft 70. In the embodiment illustrated, the second end 70*b* of the main shaft 70 is curved with a constant radius and has a straight distal portion. It is contemplated that the second end 70*b* may be formed such that the distal end 70*c* extends at a sharp right angle from a main body portion of the main shaft 70. As illustrated in FIG. 3A, a hole 74*a* extends through the second end 70*b* of the main shaft 70 and is positioned and dimensioned for engaging the biasing spring 36, see FIG. 5. It is also contemplated that in an alternative embodiment a slot 74*b* (FIG. 3B) may be formed in the second end 70*b* for engaging the biasing spring 36. The operation of the main shaft 70 is similar to that described above for main shaft 22 and is not repeated herein for brevity.

Figure 6B:
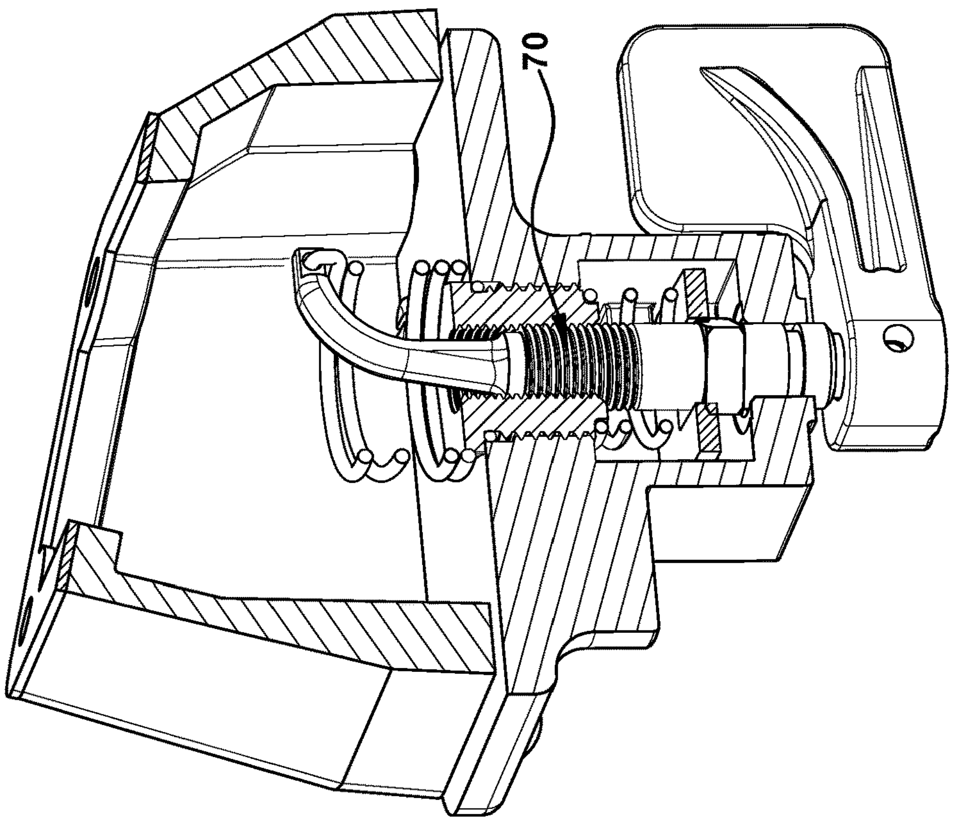
FIGS. 6A and 6B are side-by-side comparisons of the conventional main shaft of FIG. 1 and the optimized main shaft of FIG. 3A, each in a respective receptacle.
Figure 6A:
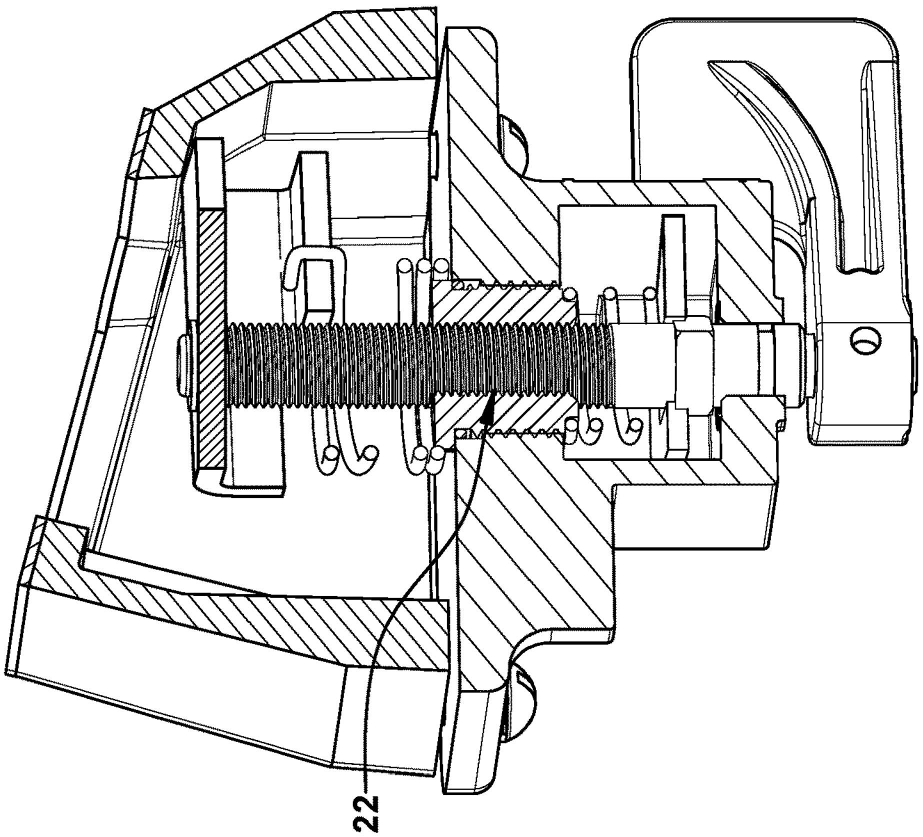
FIG. 6A (Prior Art)

According to the present invention, the main shaft 70 is a unitary component that includes both the threaded portion 72 and the contoured second end 70*b* that extends radially from the longitudinal axis B of the main shaft 70. FIGS. 6A and 6B are a side-by-side comparison of the conventional main shaft 22 of FIG. 1 and the optimized main shaft 70 of FIG. 3A. As illustrated in FIGS. 6A and 6B, the main shaft 70 is shorter than the conventional main shaft 22. It is contemplated that the main shaft 70 may be configured to be a component that can replace main shaft 22 in a receptacle already in service. A user need only remove the main shaft 22, the arm 24 and the screw and washer combination 26 and install the optimized main shaft 70.

The present invention is configured to have fewer parts than conventional interlock assemblies such that the present invention has fewer failure modes. The distal end 70*c* (FIGS. 3A and 3B) is configured to engage the biasing spring 36 that is positioned about the main shaft 70 (see, FIGS. 4 and 5).

Further, due to the reduction in parts, the length of the main shaft 70 is less than that of main shafts known heretofore.

It will be apparent to those skilled in the art that various modifications and variations can be made without departing from the spirit and scope of the claimed invention.

The invention claimed is:

1. A receptacle for receiving a plug, the receptacle comprising:
- a housing having a port for receiving the plug; and
- an interlock assembly for locking and unlocking the plug to the housing, the interlock assembly comprising:
  - a unitary main shaft having a first end and a second end, the second end contoured to extend radially from a longitudinal axis of the main shaft,
  - a spring coaxial with the longitudinal axis of the main shaft and configured to engage the second end of the main shaft, the spring configured to apply a rotational biasing force to the main shaft to bias the main shaft toward a locked position wherein a locking bar attached to the first end of the main shaft engages and locks the plug to the housing; and
  - a handle attached to the first end of the main shaft and configured to rotate the main shaft between the locked position and an unlocked position.

2. The receptacle according to claim 1, further comprising:
- a spring attached to the first end of the main shaft for biasing a locking bar attached to the main shaft into an unlocked position.

3. The receptacle according to claim 1, wherein the second end is contoured to have a constant bend radius.

4. The receptacle according to claim 1, wherein the second end extends at a right angle from the longitudinal axis of the main shaft.

5. The receptacle according to claim 1, wherein the second end includes a hole or slot configured to engage the spring.

6. An interlock assembly for locking and unlocking a plug to a receptacle, the interlock assembly comprising:
- a unitary main shaft having a first end and a second end, the second end contoured to extend radially from a longitudinal axis of the main shaft,
- a spring coaxial with the longitudinal axis of the main shaft and configured to engage the second end of the main shaft, the spring configured to apply a rotational biasing force to the main shaft to bias the main shaft toward a locked position wherein a locking bar attached to the first end of the main shaft engages and locks the plug relative to the receptacle; and a handle attached to the first end of the main shaft and configured to rotate the main shaft between the locked position and an unlocked position.

7. The interlock assembly according to claim 6, further comprising:
- a spring attached to the first end of the main shaft for biasing a locking bar attached to the main shaft into an unlocked position.

8. The interlock assembly according to claim 6, wherein the second end is contoured to have a constant bend radius.

9. The interlock assembly according to claim 6, wherein the second end extends at a right angle from the longitudinal axis of the main shaft.

10. The receptacle according to claim 6, wherein the second end includes a hole or slot configured to engage the spring.

* * * * *